Aug. 8, 1933.                F. H. OWENS                1,921,835
                            OPTICAL PRINTER
                          Filed May 28, 1929

INVENTOR.
FREEMAN H OWENS
BY Philip S. Hopkins
ATTORNEY.

Patented Aug. 8, 1933

1,921,835

UNITED STATES PATENT OFFICE 1,921,835

OPTICAL PRINTER

Freeman H. Owens, New York, N. Y.

Application May 28, 1929. Serial No. 366,646

1 Claim. (Cl. 88—24)

My invention relates to an optical printer and has for its principal object the provision of a novel arrangement of means for continuously and optically printing or exposing the images from a negative film to a positive film. This invention is particularly adapted for the printing of motion picture films either of the visual image type or so called sound films.

An important object of my invention lies in the provision of means whereby the images of a negative motion picture film may be optically printed in reduced or enlarged size, continuously.

A further object of my invention lies in the provision of a printer of the type above referred to whereby sound records on photographic film may be printed or reproduced upon a separate film at a different speed from that at which such photographic sound records were originally recorded or printed on the negative film.

It has long been a problem in connection with continuous projection printers to provide means whereby the projected images can be printed from one moving film to another in spaced relation, both negative and positive films being driven synchronously. Efforts have been made to provide such a printing apparatus wherein a single sprocket moves both films simultaneously, but in such attempts it has been difficult to adequately hurdle the sprocket shaft, or, if the printing operation is performed above or below the single driving sprocket, to secure the full advantage of the single driving means.

It is another object therefore of this invention, to provide a single sprocket driving means for both negative and positive films whereby such films are moved synchronously and to provide an optical system for the projection of the images through the center of the sprocket at right angles to the teeth thereof.

By this means the projection of an image can be made directly from a point where the negative film engages the sprocket to the positive film at the point where it engages the sprocket, thus assuring perfect synchronous movement of the two films. By this means, I eliminate the necessity of hurdling the sprocket shaft or other supporting means by complicated lens systems.

As is known in the art of recording and reproducing sound photographically, it is desirable to record the sound at a high rate of speed, but because of the fact that the recorded sound must be reproduced at the same speed as it is recorded, and further because of the fact that the sound film and the picture film, must be reproduced synchronously and at the same speed, it has been necessary either to record the sound at the relatively low rate of speed required for the proper picture taking, or rerecord the sound at the proper slower speed to synchronize with the picture film.

By my improved printer, I have provided a means whereby a photographic sound record which has been recorded at a desirable relatively high rate of speed can be printed upon a film at a slower speed and one which will enable the reproduction of the sound at the speed of the corresponding picture film.

It is therefore, another and important object of my invention to provide a printing apparatus whereby a photographic sound record may be printed continuously and optically upon a separate film synchronously with and or at a different speed from the movement of the negative film bearing such sound record.

Other objects and advantages in details of construction and arrangement of parts will be apparent as the description proceeds, reference now being had to the figures of the accompanying drawing forming a part of this specification and wherein like reference numerals indicate like parts.

In the drawing:—

Figure 1:
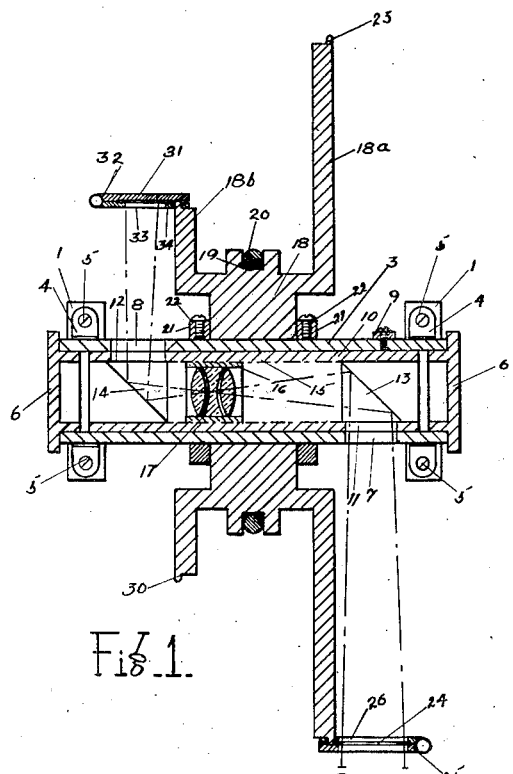
Figure 1 is a sectional view illustrating one embodiment of my improvement printer.
Figure 4:
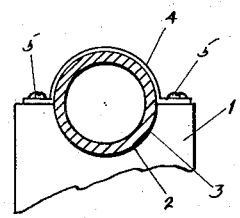
Figure 4 is a detail end view illustrating one method of securing the tubular bearing forming part of the printer in position.
Figure 3:
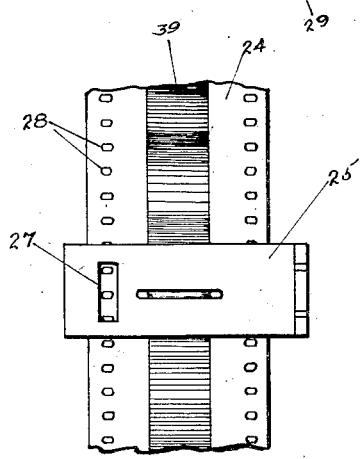
Figure 3 is a detail view of a section of motion picture film bearing a sound record, and a film gate through which it passes.

In carrying out my invention, spaced supporting posts 1 may be provided, the upper ends of which are recessed as at 2, to receive a tubular bearing 3 which may be rigidly secured to the supporting posts as by means of straps 4 passing over the tube 3 and secured to the upper ends of the posts as by the screws 5. The ends of the tube 3 may be closed by suitable caps 6 which may be readily removed to permit access to the interior of the tube.

The tube 3 is provided adjacent one end with a slit opening 7 and adjacent the opposite end of the tube, and on the opposite side from the opening 7, with a second slit opening 8. Secured within the tube 3 as by means of the set screw 9, is a sleeve 10 extending substantially the length of the tube and provided with slit openings 11 and 12 registering with the openings 7 and 8 respectively.

Suitably secured within the sleeve 10 at a point overlying the opening 7 is a prism or other reflecting device 13 so positioned as to receive illuminated images passing into the tube and sleeve from the outside, through the slit openings 7 and 11, and to reflect such images longitudinally through the tube. A second prism or other reflecting surface 14 is suitably mounted within the sleeve 10 adjacent its opposite end and in position to receive the reflected images from the prism 13 and to reflect such images outwardly through the slit openings 8 and 12.

The interior of the sleeve 10 is preferably threaded centrally as at 15, to adjustably receive a threaded lens mount 16 carrying a focusing lens system 17. This provides means for properly focusing the reflected images from the prism 13 upon the prism 14 and for adjusting such focusing lens to the proper focusing position within the sleeve. Rotatably mounted upon the tube 3 is a sprocket 18 which may be provided peripherally with a pulley groove 19 adapted to receive a belt 20 connected to any suitable source of power whereby the sprocket 18 may be rotated upon the tube 3.

Adjustable guiding collars 21 may be provided on the tube 3 and fastened in adjusted position by means of the set screws 22 whereby longitudinal movement of the sprocket 18 upon the tube after it has been properly set and adjusted, is prevented.

In the form shown in Figure 1 one end 18a of the sprocket is relatively large and provided with sprocket teeth 23 adapted to engage and move a negative motion picture film 24, said movement at the point of engagement with the sprocket being through a film gate 25 provided with a slit opening 26 extending across the width of the picture or sound images on the film 24. The film gate 25 is also provided with a vertical slot 27 in alignment with the perforations 28 on one side of the film whereby to permit engagement of the sprocket teeth 23 with such perforations through the gate.

A lamp or other light source 29 may be provided to illuminate the negative film passing the slit opening 26 in the gate 25 and it will be understood of course, that any suitable lens system for intensifying and focusing the light upon the slit 26 may be interposed between the lamp 29 and the film gate. As is apparent from Figure 1 of the drawing, the slit 26 in the film gate is in direct alignment with the slit openings 7 and 11 in the tube and sleeve respectively, whereby elongated images of the negative film 24 are projected to the reflecting prism 13 and thus through the focusing lens 17 to the prism 14 where said images are reflected outwardly through the slit openings 8 and 12.

The opposite end 18b of the sprocket 18 is, in the form shown in Figure 1, approximately half the diameter of the end 18a of the sprocket. The teeth 30 on this end 18b are adapted to engage and move a strip of positive film 31 guided at its point of engagement with the sprocket through a film gate 32, provided with a slit opening 33, through which the projected and reflected images of the film 24 may be exposed upon the positive film 31. This film gate 32 is also provided with a vertical slit 34 to permit the sprocket teeth 30 to engage the film through the film gate.

In the form shown in Figure 1, I have illustrated an optical printer by means of which the images of a standard size motion picture film whether those images are visual pictures or a sound record, may be continuously and optically printed upon a half size film such as is commonly used in the so called amateur motion picture cameras. The end 18a of the sprocket is as already stated, substantially twice the size or diameter of the end 18b thereof whereby to compensate for the speed at which the two films of different sizes are run. In this connection however, it may be stated that preferably the diameter of the sprocket end 18a is very slightly less than twice the diameter of the end 18b, in order to compensate for the shrinkage of the negative film 24 as against the non-shrunk positive film 31.

The focusing lens 17 is of course, properly adjusted within the tube to take care of the reduced projected images whereby resultant exposures upon the positive film 31 will be in sharp focus.

It will be understood also that if it is desired to enlarge images from a half size film to a full sized film, a lamp may be placed back of the small film which in such case is the negative film, and the printing operation reversed from that above described.

Figure 2:
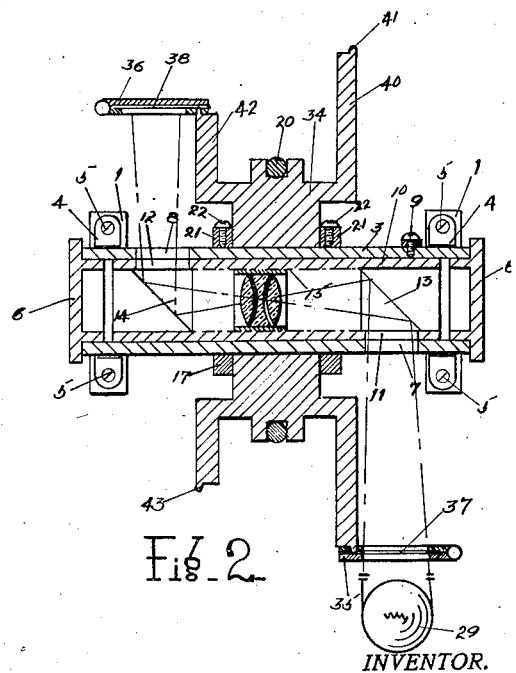
Figure 2 is a sectional plan view of a modified form thereof.

As already stated, it may be desirable to print upon a separate film at a given speed, a sound record previously recorded or printed upon another film at a different speed. Figure 2 of the drawing shows the adaptability of my improved printer for this purpose.

In this figure, the construction and all of the parts are identical with those shown in Figure 1 except the sprocket 34 is substituted for the sprocket 18 and the film gates 35 and 36 are substituted for the film gates 25 and 32 respectively. In this case the film gates may be the same size and the negative film 37 and the positive film 38 may be the same size, it being merely desired to reproduce the sound record at a different speed.

Assuming that the sound record 39 on the film 37 has been recorded or printed thereon at a speed of say, 120 feet per minute, and it is desired to print it upon the film 38 at a speed of 90 feet per minute, which ordinarily corresponds to the speed at which the combined sound and motion pictures are reproduced. The end 40 of the sprocket 34 is of such diameter that the teeth 41 thereof, will engage and move the film 37 at a speed of 120 feet per minute, the speed at which the sound record was recorded thereon. The end 42 of the sprocket 34 however, is of such diameter that the teeth 43 thereof will engage and move the positive film 38 at a speed of 90 feet per minute. Obviously, as the sprocket 34 is driven at a constant speed through means of the belt 20, the movement of the two films will be synchronous. As in the case described in connection with Figure 1 the diameter of the end 40 of the sprocket may be a trifle less than the exact proportion required to give the desired variance in speed, in order to compensate for the shrinkage in the negative film.

The focusing lens 17 is of course properly adjusted within the tube 10 whereby to sharply focus the projected and reflected sound record from the film 37 to the film 38.

It will be thus seen that by my invention, I have provided an optical printer whereby the illuminated images of a negative film, whether they be pictures or sound records, may be projected and exposed upon a positive film at a rapid rate of speed and in perfect synchronism, without interference from the sprocket which moves the two films simultaneously and synchronously and by means of which reduction or enlarging printing may be accomplished, and also by means of which a sound record may be printed for reproduction at a rate of speed different from that at which the original was recorded or printed.

Of course, many changes may be made in details of construction and operation of my invention. I do not limit myself, therefore, to the exact form herein shown and described other than by the appended claim.

I claim:

An optical reduction printer comprising a single rotatable sprocket having spaced toothed end portions of widely different diameters, means for supporting a negative image bearing film for engagement by the teeth of the larger of said end portions, means laterally spaced from said first means for supporting a sensitized positive film for engagement by the teeth of the smaller of said end portions, means for illuminating said negative film, and a lens for passing light from said illuminated film to the positive film, said lens being nearer to and focused upon said positive film.

FREEMAN H. OWENS.